(12) United States Patent
Szarszewski et al.

(10) Patent No.: US 9,375,888 B2
(45) Date of Patent: Jun. 28, 2016

(54) METHOD FOR THE MANUFACTURING OF A CLADDING ELEMENT FOR A PASSENGER CABIN OF A VEHICLE

(71) Applicant: DIEHL AIRCABIN GMBH, Laupheim (DE)

(72) Inventors: Maik Szarszewski, Illertissen (DE); Matthias Hoffmann, Mietingen (DE)

(73) Assignee: DIEHL AIRCABIN GMBH, Laupheim (DE)

( * ) Notice: Subject to any disclaimer, the term of this patent is extended or adjusted under 35 U.S.C. 154(b) by 84 days.

(21) Appl. No.: 14/294,572

(22) Filed: Jun. 3, 2014

(65) Prior Publication Data
US 2014/0374011 A1    Dec. 25, 2014

(30) Foreign Application Priority Data

Jun. 22, 2013 (DE) .......................... 10 2013 010 485
Nov. 19, 2013 (DE) .......................... 10 2013 019 355

(51) Int. Cl.
| | |
|---|---|
| *B29C 70/34* | (2006.01) |
| *B29D 99/00* | (2010.01) |
| *B29K 61/04* | (2006.01) |
| *B29K 105/08* | (2006.01) |
| *B29L 31/30* | (2006.01) |

(52) U.S. Cl.
CPC ............ *B29D 99/0021* (2013.01); *B29C 70/34* (2013.01); *B29K 2061/04* (2013.01); *B29K 2105/0872* (2013.01); *B29K 2611/00* (2013.01); *B29L 2031/3055* (2013.01); *B29L 2031/3067* (2013.01); *B29L 2031/3076* (2013.01); *Y10T 156/1044* (2015.01)

(58) Field of Classification Search
None
See application file for complete search history.

(56) References Cited

U.S. PATENT DOCUMENTS

2009/0095206 A1\*  4/2009  Dacus .................... B29C 70/088
108/57.27

FOREIGN PATENT DOCUMENTS

GB                723535        \*   2/1955

\* cited by examiner

*Primary Examiner* — Barbara J Musser
(74) *Attorney, Agent, or Firm* — Scully Scott Murphy and Presser

(57) ABSTRACT

A method for manufacturing a cladding element for a passenger cabin of a vehicle is provided. A first layer is introduced into a forming shell. A support layer is provided onto the first layer, such that the first layer extends beyond an edge of the support layer. An elastic material strip is provided onto a portion of the first layer hat extends beyond the support layer, such that the material strip is flush with the edge of the support layer. A second layer is provided onto the support layer, such that a portion of the second layer extends beyond the edge of the support layer and is superimposed on the material strip. The forming shell is closed and a pressure is exerted on the layer arrangement accommodated in the forming shell at a temperature between 50° C. to 100° C., to form a sandwich structure.

19 Claims, 3 Drawing Sheets

METHOD FOR THE MANUFACTURING OF A CLADDING ELEMENT FOR A PASSENGER CABIN OF A VEHICLE

BACKGROUND OF THE INVENTION

The invention relates to a method for the manufacturing of a cladding element for a passenger cabin of a vehicle, in particular of a land vehicle, an aircraft, or a watercraft.

DISCUSSION OF THE PRIOR ART

According to the prior art, in particular for the cladding of passenger cabins of aircraft, cladding elements which are manufactured from a lightweight composite material are known. Here, a support layer is laminated between two layers which are provided with fibres and impregnated with a resin. The support layer has a honeycomb structure. Said support layer is typically manufactured from a lightweight material which is reinforced with aramid fibres.

Cladding elements of this type, according to the prior art, are assembled on the inner side of the passenger cabin of an aircraft such that a movement gap remains between the successive cladding sheets, an adjoining bulkhead or the like. Here, the movement gap is dimensioned such that, in the case of an elastic deformation of the passenger cabin, no direct contact is established between adjacent cladding elements or the like. According to the prior art, the movement gap is injected in a filling manner with an elastic material or sealed with an inserted rubber profile. The attaching of cladding sheets, while maintaining a movement gap of a predefined width, and the subsequent sealing of the movement gap with an elastic material cause an outlay in terms of assembly, time and costs.

SUMMARY OF THE INVENTION

It is an object of the invention to dispense with the disadvantages according to the prior art. In particular, it is the intention to provide a method for the manufacturing of a cladding element for a passenger cabin of a vehicle, which method can be implemented as simply as possible and is as cost-effective as possible and which cladding element can be assembled without maintaining a movement gap.

According to the invention, a method for the manufacturing of a cladding element for a passenger cabin of a vehicle, in particular of a land vehicle, an aircraft, or a watercraft, comprising the following steps, is proposed:

introducing a first layer, which is provided with first fibres and impregnated with a resin, into a forming shell, layering of a support layer, which is sheet-like and reinforced with second fibres, onto the first layer, such that the first layer extends beyond at least one edge of the support layer, layering of an elastic material strip onto that portion of the first layer that extends beyond the support layer, such that the material strip bears flushly against the edge of the support layer, layering of a second layer, which is provided with the first fibres and impregnated with the resin, onto the support layer, such that a portion of the second layer extends beyond the edge and superimposes the material strip, and closing the forming shell and exerting a pressure on the layer arrangement, which is accommodated in the forming shell, at a temperature in the region of 50 to 100° C., such that a sandwich structure is formed.

Using the proposed method, the manufacturing of a cladding element, in which an elastic material strip is integrated in the sandwich structure at least along one edge, is achieved in a simple and cost-effective manner. Such a cladding element can be assembled without maintaining a movement gap and while bearing flushly against an adjacent cladding element. This facilitates assembly. The requirement of filling a movement gap with an elastic material or a sealing profile is dispensed with.

According to an advantageous configuration, the cladding element is laminated in a vacuum process. To this end, the forming shell is advantageously closed by means of a film and a vacuum is created under pressure.

Phenolic resin, which, during pressing, is cured at a temperature of 70 to 90° C., may be used as a resin.

According to a particularly advantageous configuration, during pressing, the material strip is plastically deformed to a shape which is predefined by the forming shell. The material strip may have a standardized geometry, for example have a rectangular cross section. The predefined shape of the forming shell may be configured to be tapered and rounded at the edge, such that, during pressing, the material strip assumes a rounded and/or tapered shape at its free edge. This makes it possible for material strips of a standardized geometry to be used. The predefined shape can be imparted to such a material strip first during pressing.

The predefined shape is expediently of such a type that a thickness of the material strip reduces towards the free edge of the latter. This imparts to the material strip an elasticity which increases towards the free end of said material strip. The proposed material strip will then adapt particularly well to a further edge of an adjacent cladding element.

According to a further advantageous configuration, the material strip has a default compression zone which is formed by at least one recess which runs substantially parallel to the edges. The recess may have a U-shaped or V-shaped cross section. Other cross sections are also conceivable. On account of the recess, the material strip has a lower thickness in the region of the default compression zone. As a result, said material strip is able to elastically deform more easily in the default compression zone. This also contributes towards a tight and flush connection to an adjacent cladding element or the like.

According to a further advantageous configuration, the material strip is formed from a foam, preferably a closed-cell foam. The foam is manufactured from an elastic material. The material strip is preferably manufactured from a chloroprene elastomer. It has surprisingly been found that this material forms a particularly strong connection to the first and the second layers, in particular when phenolic resin is used as a resin.

According to a further configuration, the first fibres are glass fibres or carbon fibres. Advantageously, the second fibres are aramid fibres or carbon fibres. The support layer may have a honeycomb structure, wherein the delimiting walls of the honeycombs are oriented approximately vertically to a visible side of the cladding component. Such a support structure, has outstanding compressive resistance in a direction which is perpendicular to the visible side of the cladding element.

According to a further advantageous configuration, in a further method step, a flexible layer is adhesively bonded onto the second layer of the sandwich structure and the material strip extending away therefrom. The flexible layer is advantageously formed from an open-cell foam. Said flexible layer reduces the risk of injury and improves the haptic properties of the proposed cladding element.

Furthermore, in a further method step, a decorative layer, which covers the visible side of the cladding element, can be adhesively bonded onto the sandwich structure or onto the flexible layer. The decorative layer may be formed from, for example, an artificial leather or from a plastic film. Said decorative layer is expediently water-repellent. The decorative layer imparts to the cladding element a pleasing visual effect.

BRIEF DESCRIPTION OF THE DRAWINGS

Exemplary embodiments of the invention are described in more detail in the following by means of the drawings, in which.

DETAILED DESCRIPTION OF THE INVENTION

Figure 1:
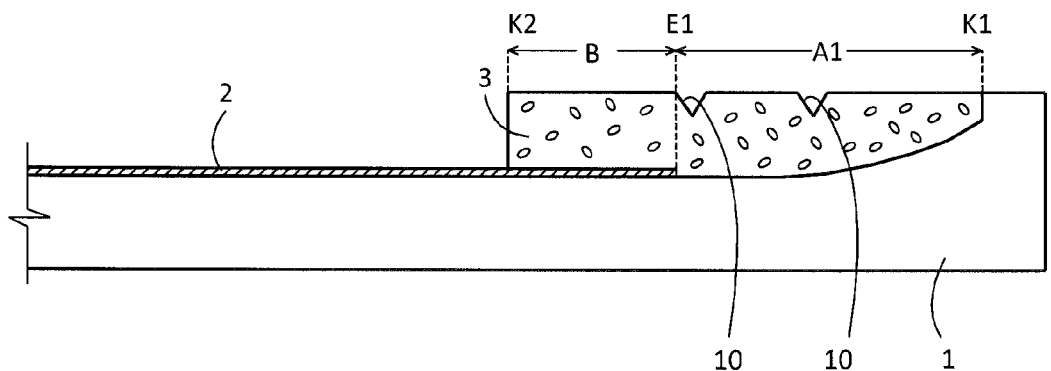
FIG. 1 shows a schematic cross-sectional view in a first method step.
Figure 2:
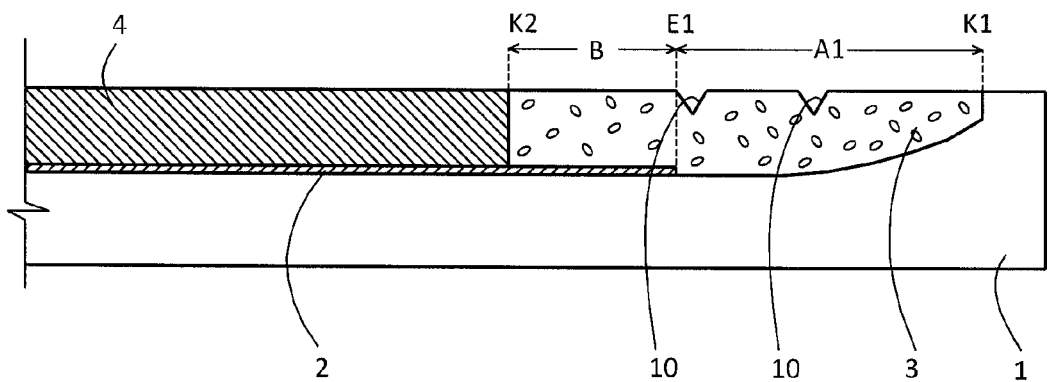
FIG. 2 shows a schematic cross-sectional view in a second method step.

In FIGS. 1 to 4, a mould, or forming shell, which represents the visible side of the cladding element to be manufactured, is identified with the reference sign 1.

In a first method step, initially a first prepreg 2 is laid into the forming shell 1. The first prepreg 2 is dimensioned such that a first distance A1 remains between a first edge K1 of the forming shell 1 and an end E1 of the first prepreg 2. The first distance A1 is, for example, 5 to 50 mm, preferably 10 to 30 mm. Thereafter, an elastic material strip 3 is laid into the forming shell 1, and specifically in such a manner that said material strip 3 bears on the first edge K1 of the forming shell 1. The material strip 3 is dimensioned such that, in portions, it superimposes the first prepreg 2. An overlapping portion, which extends from a second edge K2 of the material strip 3 to the end E1 of the first prepreg 2, has a width B. The width B of the overlapping portion may be 5 to 20 mm, preferably 10 to 15 mm.

In a second method step, a support sheet 4 is then laid onto the first prepreg 2, and specifically in such a manner that the third edge of said support sheet 4 bears flushly against an edge K2, which faces the support sheet 4, of the material strip 3. In the region of the second edge K2, the material strip 3 has approximately the same thickness as the support layer 4.

Figure 3:
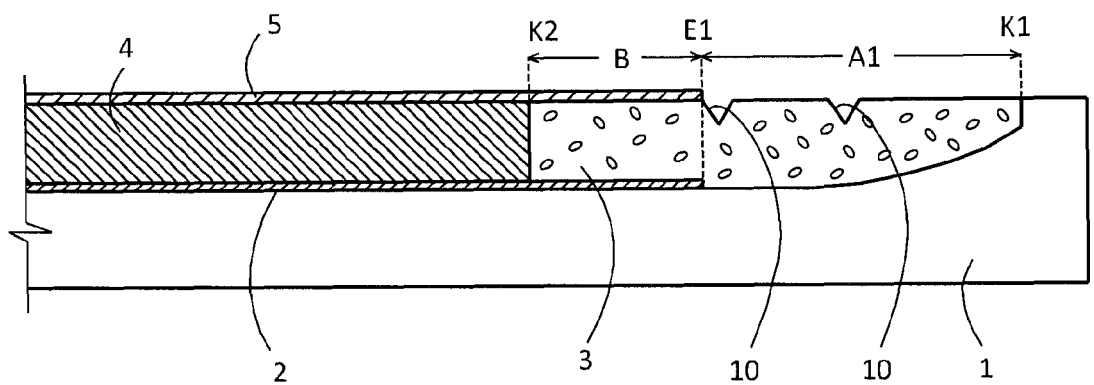
FIG. 3 shows a schematic cross-sectional view in a third method step.

In the third method step, shown in FIG. 3, a second prepreg 5 is laid onto the support layer 4. The second prepreg 5 is dimensioned such that, similar to the first prepreg 2, it extends across the material strip 3 and, specifically, advantageously across the width B.

Figure 4:
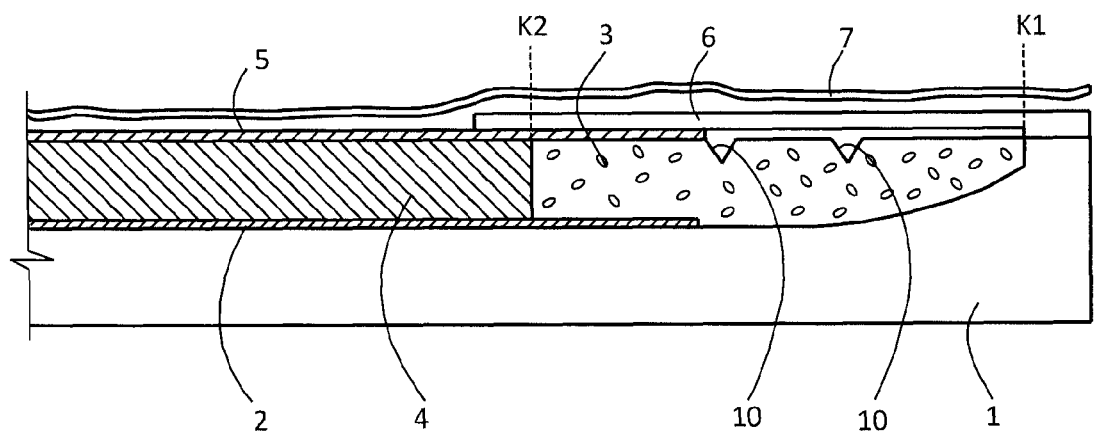
FIG. 4 shows a schematic cross-sectional view in a fourth method step.
Figure 5:
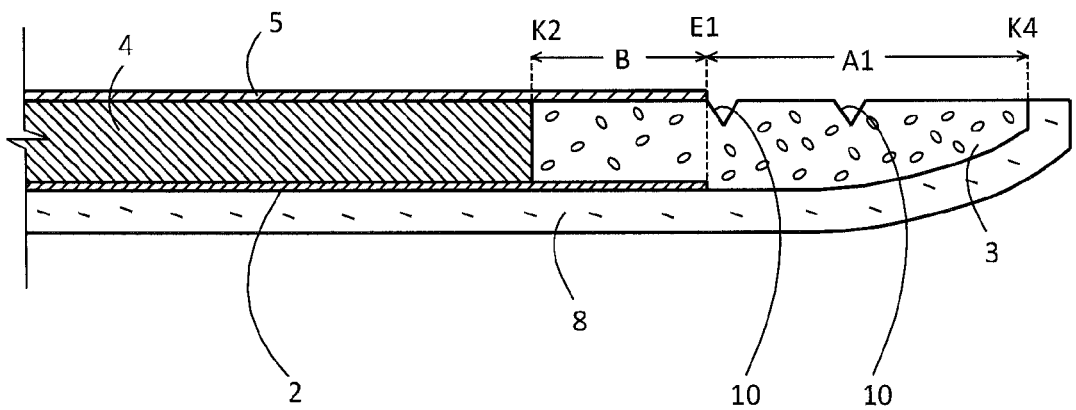
FIG. 5 shows a schematic cross-sectional view in a fifth method step.
Figure 6:
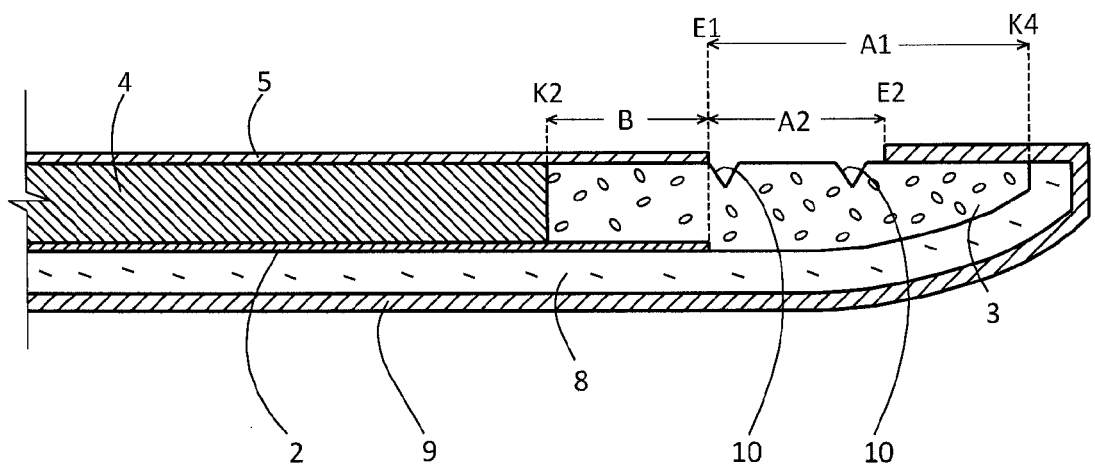
FIG. 6 shows a schematic cross-sectional view in a sixth method step.

In the fourth method step, shown in FIG. 4, a pressure shim 6, which extends from the periphery of the forming shell 1 via the second edge K2 across into the region of the support sheet 4, is laid onto the material strip 3. The reference sign 7 identifies a vacuum film which superimposes the entire layer arrangement.

The layer arrangement is now evacuated, on account of which pressure acting on the layer arrangement is built up by means of the vacuum film 7. At the same time, the layer arrangement is heated to a temperature in the region of 80° C. In this process, a phenolic resin, which is contained in the first prepreg 2 and in the second prepreg 5, is cured. The phenolic resin bonds with the support layer 4 and, advantageously, simultaneously with the material strip 3 manufactured from a chloroprene elastomer. Overall, a firm sandwich structure, the free fourth edge K4 of which is formed by the elastic material strip 3, is formed.

Following demoulding, in a fifth method step, a flexible layer 8 is adhesively bonded, for example by means of a contact adhesive, onto a first layer, which is formed from the first prepreg 2, and also onto a surface of the adjoining material strip 3. The flexible layer 8 may be manufactured from, for example, an open-cell foam. The flexible layer 8 may superimpose the fourth edge K4 of the material strip 3.

Finally, in a sixth method step, a decorative layer 9, which is manufactured from, for example, artificial leather, is adhesively bonded, expediently by means of a contact adhesive, onto the flexible layer 8. The decorative layer 9 is advantageously pulled over the fourth edge K4 and fastened by means of the contact adhesive on a lower side of the material strip 3. A second distance A2 remains between a further end E2 of the decorative layer on the lower side of the material strip 3 and the end E1 of the second layer which is formed from the second prepreg 5. The second distance A2 may be 0.5 to 30 mm, preferably 10 to 20 mm. The reference sign 10 identifies recesses which are provided on the lower side of the material strip 3. The decorative layer 9 is arranged on the lower side such that the recesses 10. The layers formed from the first prepreg 2 and the second prepreg 5 also do not the recesses 10.

On account of the elastic material strip 3, the fourth edge K4 of the cladding element manufactured in this manner is elastic. Said fourth edge can be compressed is the direction of the second edge K2, in particular. Default compression zones are in each case formed in the region of the recesses 10. There, a thickness of the material strip 3 is reduced. A compression depth can be increased by the provision of the recesses 10.

The cladding element which is manufactured according to the proposed method is compressible at the edge. As a consequence, the provision of a movement gap in relation to an adjacent cladding element, an adjacent bulkhead or the like, can be dispensed with. Any movements between an adjacent cladding element, an adjacent bulkhead or the like, are compensated by an elastic movement of the material strip 3.

LIST OF REFERENCE SIGNS

1 Forming shell
2 First prepreg
3 Material strip
4 Support layer
5 Second prepreg
6 Pressure overlay
7 Vacuum film
8 Flexible layer
9 Decorative layer
10 Recesses
A1 First distance
A2 Second distance
B Width
E1 End
E2 Further end
K1 First edge
K2 Second edge
K4 Fourth edge

What is claimed is:

1. A method for manufacturing a cladding element for a passenger cabin of a vehicle, the method comprising:

introducing a first layer into a forming shell, wherein the first layer comprises first fibres and is impregnated with a resin, providing a support layer onto the first layer, such that the first layer extends beyond at least one edge of the support layer, wherein the support layer is reinforced with second fibres, providing an elastic material strip onto a portion of the first layer that extends beyond the support layer, such that the material strip is flush with the edge of the support layer, providing a second layer onto the support layer, such that a portion of the second layer extends beyond the edge of the support layer and is superimposed on the material strip, wherein the second layer comprises the first fibres and is impregnated with the resin, and closing the forming shell and exerting a pressure on the layer arrangement accommodated in the forming shell, at a temperature in a range of 50° C. to 100° C., such that a sandwich structure is formed.

2. The method according to claim 1, wherein said vehicle is a land vehicle, an aircraft or a watercraft.

3. The method according to claim 1, wherein the forming shell is closed by a film wrapping around the forming shell and the pressure is generated through vacuum.

4. The method according to claim 1, wherein the resin comprises a phenolic resin which is cured at a temperature of 70° C. to 90° C. during pressing.

5. The method according to claim 1, wherein, during pressing, the material strip is plastically deformed to a shape which is predefined by the forming shell.

6. The method according to claim 1, wherein a thickness of the material strip reduces towards a free edge of the material strip.

7. The method according to claim 5, wherein the material strip has a default compression zone which is formed by at least one recess, said at least one recess being substantially parallel to the free edge of the material strip.

8. The method according to claim 1, wherein the material strip is formed from a foam.

9. The method according to claim 8, wherein said foam is a closed-cell foam.

10. The method according to claim 1, wherein the material strip is manufactured from a chloroprene elastomer.

11. The method according to claim 1, wherein the first fibres comprise at least one of glass fibres and carbon fibres.

12. The method according to claim 1, wherein the second fibres comprise at least one of aramid fibres and carbon fibres.

13. The method according to claim 1, wherein the support layer has a honeycomb structure and wherein the delimiting walls of the honeycombs are oriented approximately vertically to a visible side of the cladding component.

14. The method according to claim 1, wherein a flexible layer is adhesively bonded onto the second layer of the sandwich structure and the material strip.

15. The method according to claim 14, wherein the flexible layer is formed from an open-cell foam.

16. The method according to claim 1, wherein a decorative layer, which covers the visible side of the cladding element, is adhesively bonded onto the sandwich structure.

17. The method according to claim 16, wherein the decorative layer is formed from an artificial leather or from a plastic film.

18. The method according to claim 14, wherein a decorative layer, which covers the visible side of the cladding element, is adhesively bonded onto the flexible layer.

19. The method according to claim 18, wherein the decorative layer is formed from an artificial leather or from a plastic film.

* * * * *